United States Patent
Etkin et al.

(10) Patent No.: US 9,075,545 B2
(45) Date of Patent: Jul. 7, 2015

(54) SYNCHRONIZING SENSOR DATA USING TIMESTAMPS AND SIGNAL INTERPOLATION

(75) Inventors: Raul Hernan Etkin, Sunnyvale, CA (US); Farzad Parvaresh, Menlo Park San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 13/563,732

(22) Filed: Aug. 1, 2012

(65) Prior Publication Data
US 2014/0040653 A1 Feb. 6, 2014

(51) Int. Cl.
| G06F 1/12 | (2006.01) |
| G01V 1/36 | (2006.01) |
| G06F 17/17 | (2006.01) |
| G01V 1/26 | (2006.01) |

(52) U.S. Cl.
CPC *G06F 1/12* (2013.01); *G01V 1/362* (2013.01); *G06F 17/17* (2013.01); *G01V 1/26* (2013.01); *G01V 2200/12* (2013.01); *G01V 2210/57* (2013.01)

(58) Field of Classification Search
CPC .................................... G06F 1/04; G06F 1/12
USPC ................................................. 713/400, 600
See application file for complete search history.

(56) References Cited

U.S. PATENT DOCUMENTS

| 5,566,180 | A | * | 10/1996 | Eidson et al. ................. 370/473 |
| 6,173,207 | B1 | | 1/2001 | Eidson |
| 6,654,356 | B1 | * | 11/2003 | Eidson et al. ................. 370/303 |
| 7,542,850 | B2 | * | 6/2009 | Humphrey et al. ............... 702/2 |
| 8,050,881 | B1 | * | 11/2011 | Yeung et al. .................... 702/89 |
| 8,787,112 | B2 | | 7/2014 | Cook |
| 2007/0219751 | A1 | | 9/2007 | Huang |
| 2008/0189044 | A1 | * | 8/2008 | Chamberlain et al. .......... 702/14 |
| 2010/0183034 | A1 | * | 7/2010 | Kroepfl et al. ................. 370/503 |
| 2011/0002324 | A1 | | 1/2011 | Falck et al. |
| 2012/0117272 | A1 | | 5/2012 | Lynch et al. |
| 2012/0163520 | A1 | | 6/2012 | Liu et al. |
| 2013/0100564 | A1 | * | 4/2013 | Zhang et al. .................... 361/78 |

OTHER PUBLICATIONS

Sheriff, N.; Time Stamp Performance in Low Power Bio-feedback Network ; Issued: 2011 ; http://www.europeanjournalofscientificresearch.com/ISSUES/EJSR_65_3_09.pdf ; on pp. 377-385; vol. 65; Issue: 3.
Romer, et al. Time Synchronization and Calibration in Wireless Sensor Networks. ETH Zurich, Switzerland.

* cited by examiner

*Primary Examiner* — Chun Cao
(74) *Attorney, Agent, or Firm* — HP Patent Dept.

(57) ABSTRACT

A method of synchronizing sensor data using timestamps and interpolation. The method includes receiving sequences of time-stamped data indicative of physical events from each of a plurality of sensors; generating an interpolation filter according to desired sampling times; and interpolating the sequences of time-stamped data with the generated filter to obtain sequences of data that are synchronized.

14 Claims, 12 Drawing Sheets

SYNCHRONIZING SENSOR DATA USING TIMESTAMPS AND SIGNAL INTERPOLATION

BACKGROUND

In many applications, data indicative of physical conditions are sensed at various locations around a network. In such applications, the data are often tagged with timing information. For example, in exploring for oil, an area may be surveyed using sensors (accelerometers) disposed in a grid. Seismic shocks are induced by triggers such as explosives or vibrator trucks, and in response the sensors provide data indicative of soil content and condition. Data from each sensor is time-stamped and sent to a central processor for analysis. Free-running clocks at the sensors may be used to time-stamp the data.

BRIEF DESCRIPTION OF THE DRAWINGS

The figures are not drawn to scale. They illustrate the disclosure by examples.

DETAILED DESCRIPTION

Illustrative examples and details are used in the drawings and in this description, but other configurations may exist and may suggest themselves. Parameters such as voltages, temperatures, dimensions, and component values are approximate. Terms of orientation such as up, down, top, and bottom are used only for convenience to indicate spatial relationships of components with respect to each other, and except as otherwise indicated, orientation with respect to external axes is not critical. For clarity, some known methods and structures have not been described in detail. Methods defined by the claims may comprise steps in addition to those listed, and except as indicated in the claims themselves the steps may be performed in another order than that given.

The systems and methods described herein may be implemented in various forms of hardware, software, firmware, special purpose processors, or a combination thereof. At least a portion thereof may be implemented as an application comprising program instructions that are tangibly embodied on one or more program storage devices such as hard disks, magnetic floppy disks, RAM, ROM, and CDROM, and executable by any device or machine comprising suitable architecture. Some or all of the instructions may be remotely stored; in one example, execution of remotely-accessed instructions may be referred to as cloud computing. Some of the constituent system components and process steps may be implemented in software, and therefore the connections between system modules or the logic flow of method steps may differ depending on the manner in which they are programmed.

In sensor networks such as the oil exploration networks described above, free-running clocks (that is, clocks not synchronized to a central timing source) are desirable because they use less energy and are simpler in design than centrally-synced clocks. These clocks may be crystal-controlled and typically are characterized by a high degree of short-term stability but slow drift over time. Time stamps provided by various ones of these clocks can be off by as much as several microseconds as a result of this drift, with the result that sequences of data from different sensors are not in sync with each other.

In addition, in some instances other factors such as temperature variations, limited timing resolution of IEEE 802.11 time sync functions, propagation delay of timing beacons, processing delays at the sensors, and error in measuring the elapsed time between arrival of a signal from a timing beacon and the data sampling time also introduce errors into the time stamps. These various errors may be random, and therefore uncertainty is associated with the time stamps within one data sequence—in other words the timing information is noisy.

Accordingly, there is a need for a way to synchronize sequences of data, including noisy sequences, coming from different sensors having clocks that are not perfectly synced with each other.

Figure 1:
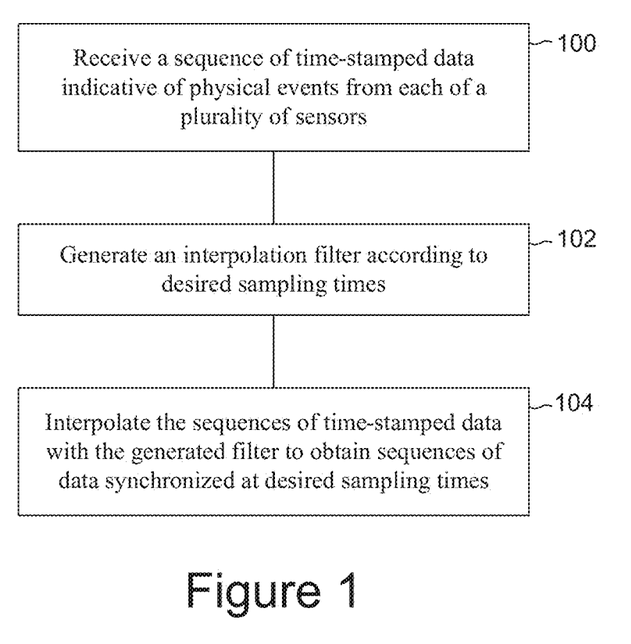
FIG. 1 is a flowchart illustrating a method of synchronizing sensor data using timestamps and signal interpolation according to an example.

FIG. 1 gives an example of a method of synchronizing sensor data using timestamps and interpolation. The method includes receiving a sequence of time-stamped data indicative of physical events from each of a plurality of sensors (100), generating an interpolation filter according to desired sampling times (102), and interpolating the sequences of time-stamped data with the generated filter to obtain sequences of data synchronized at desired sampling times (104).

In some examples the interpolation filter comprises a low-pass impulse response filter with roll-off, as will be described in more detail presently.

Figure 2:
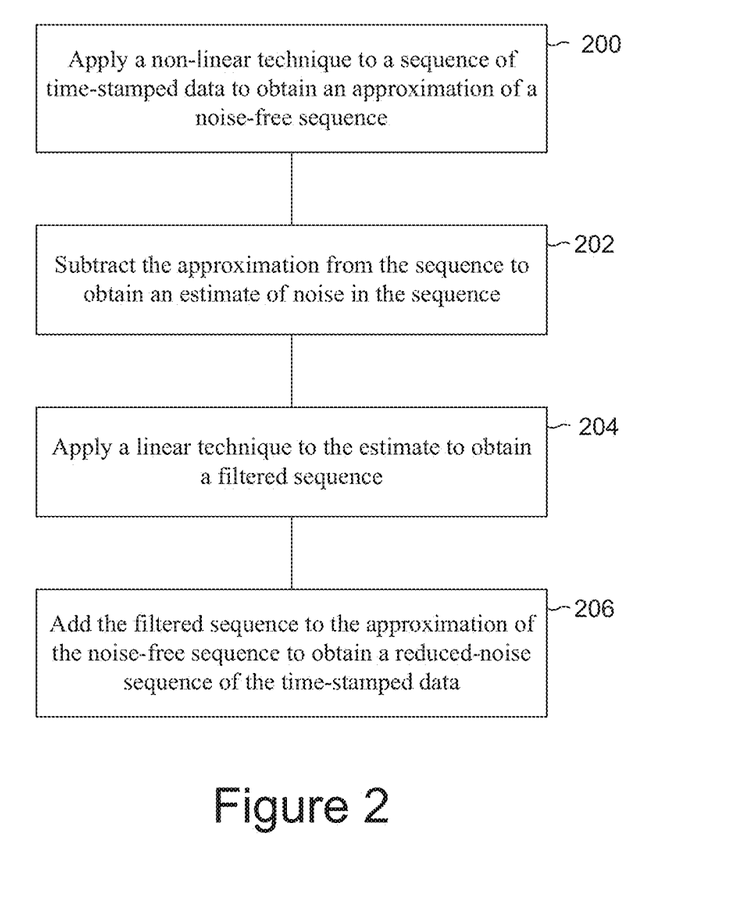
FIG. 2 is a flowchart giving an example of reduction of noise by linear and non-linear estimation in the method illustrated in FIG. 1.

As shown in FIG. 2, in some examples the method also includes reducing noise in at least one of the sequences of time-stamped data by applying a non-linear technique to a sequence to obtain an approximation of a noise-free sequence (200), subtracting the approximation from the sequence to obtain an estimate of noise in the sequence (202), applying a linear technique to the estimate to obtain a filtered sequence (204), and adding the filtered sequence to the approximation of the noise-free sequence to obtain a reduced-noise sequence of the time-stamped data (206). The linear and non-linear estimating techniques interoperate together to reduce the noise, overcoming the limitations of using either technique by itself.

In some examples the non-linear technique comprises approximating the noise-free sequence at intervals by linear least-squares approximation and interpolating between intervals by cubic spline interpolation. The linear technique may comprise one of a fast Fourier transform and a linear low-pass time-invariant finite impulse response filter.

Figure 3:
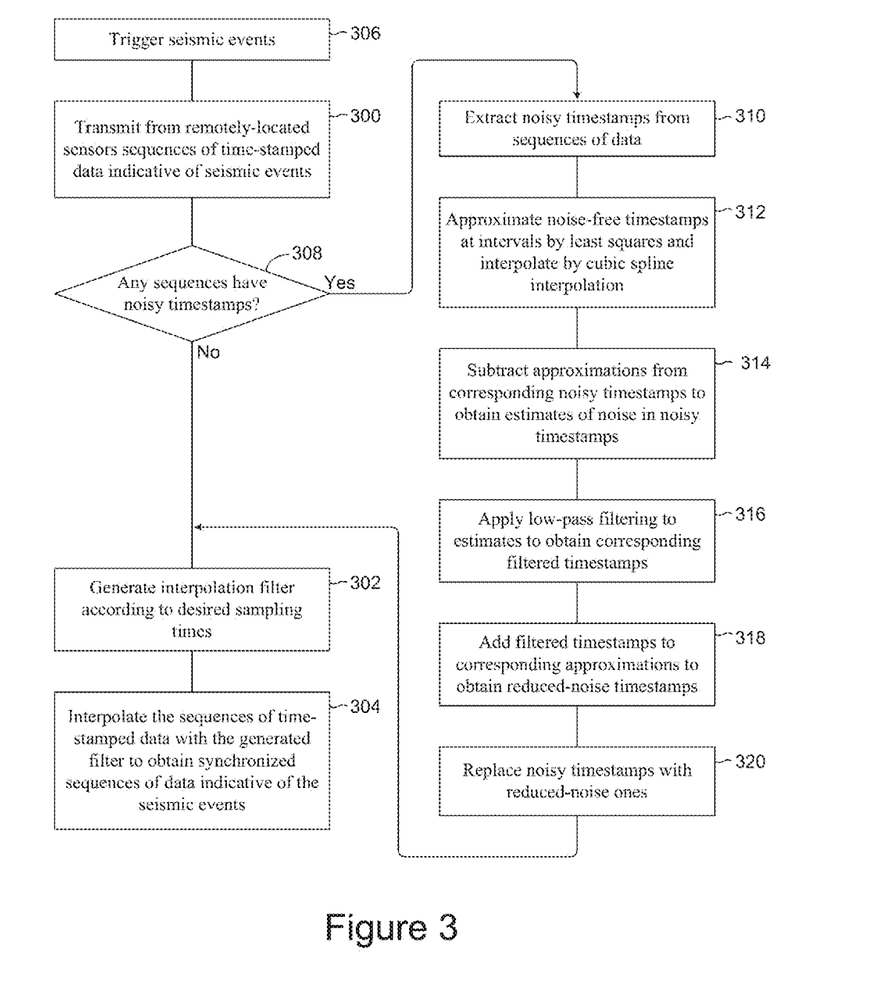
FIG. 3 is a flowchart illustrating a method of synchronizing sequences of data indicative of seismic events using timestamps and signal interpolation according to an example.

FIG. 3 illustrates an example of a method of analyzing data indicative of seismic events using timestamps and interpolation. The method includes transmitting from each of a plurality of remotely-located sensors a sequence of time-stamped data indicative of seismic events (300), generating an interpolation filter according to desired sampling times (302), and interpolating the sequences of time-stamped data with the generated filter to obtain synchronized sequences of data indicative of the seismic events (304). In some examples the interpolation filter comprises a low-pass impulse response filter with roll-off.

In some examples the method includes triggering the seismic events (306). For example, this may be done by triggers such as explosives or vibrator trucks. The events may be triggered under computer control or asynchronously. In other examples the seismic events are not caused as part of the method but occur naturally and are sensed as they occur.

Some examples include noise reduction. For example, if any of the sequences of data have noisy timestamps (308), the noise in the timestamps may be reduced. The noisy timestamps are extracted from the sequences of data (310). A non-linear process is used on the noisy timestamps from each sequence of data to obtain a corresponding approximation of noise-free timestamps (312). Each approximation is subtracted from its corresponding noisy timestamps to obtain an estimate of the noise in the noisy timestamps (314). Each estimate is filtered with a low-pass filter to obtain corresponding filtered timestamps (316). The filtered timestamps are added to their corresponding approximations to obtain reduced-noise timestamps (318). The noisy timestamps in each sequence are replaced with their corresponding reduced-noise timestamps (320).

The non-linear process may include computing a linear least-squares approximation of noise-free time stamps at intervals and interpolating between the intervals with cubic spline interpolation (312).

Figure 4:
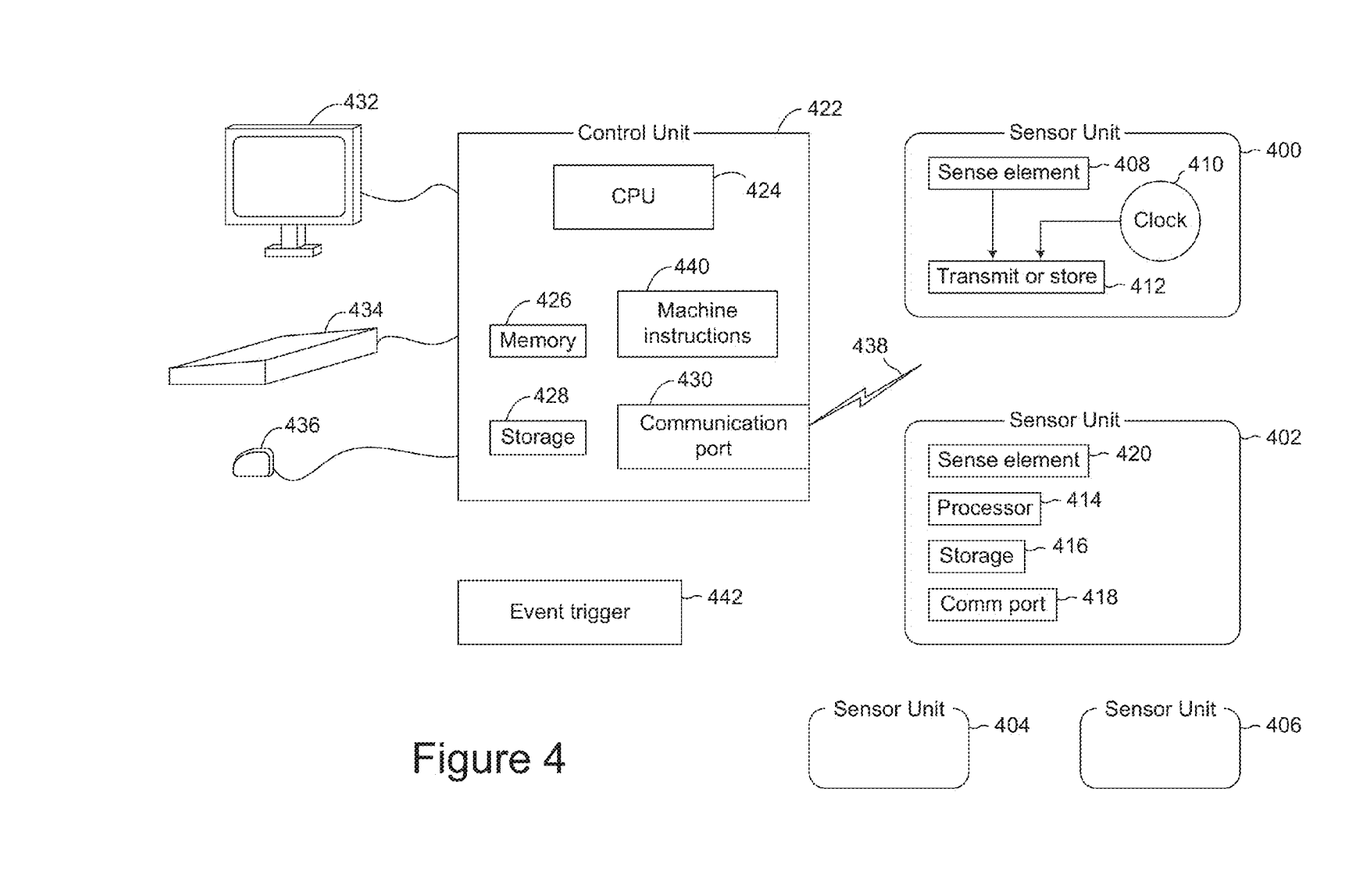
FIG. 4 is a block diagram of an example of a seismic data analysis system to provide a synchronized sequences of data indicative of seismic events using timestamps and signal interpolation.

FIG. 4 provides an example of a data analysis system using timestamps and interpolation to provide a synchronized sequence of data indicative of events. The system includes a plurality of remotely-located, spaced-apart sensor units. In this example there are four such sensor units 400, 402, 404, and 406, but in other examples there may be more or fewer.

The sensor unit 400 includes a sense element 408 that provides a signal indicative of a physical event, a clock 410, and a device 412 for time-stamping the signal provided by the sense element and either transmitting the signal or storing it for later review. In some examples the clock 410 comprises a free-running oscillator that may be under crystal control. The device 412 may comprise a separate element as in the example of FIG. 4 or its functions may be performed by circuitry in the sense element or the clock.

Some sensor units may include other elements. As an example, the sensor unit 402 is shown with a processor 414, storage 416, and a communication port 418 in addition to its sense element 420. The processor 416 may provide a clock signal, or a separate clock similar to the clock 410 may be included. Machine instructions (not shown) may be included, either hard-wired or stored or communicated from elsewhere as needed.

The other sensor units 404 and 406 also include sense elements and one or more other elements such as those shown in the example sensor units 400 and 402.

The system includes a control unit 422. In this example the control unit 422 includes a central processing unit (CPU) 424, memory 426, data storage 428, and a communication port 430. Peripheral devices such as a monitor 432, keyboard 434, and mouse 436 may be provided for a user.

The control unit 422 is in communication with the sensor units as indicated by a communication symbol 438 to:
  receive from each sensor a sequence of time-stamped data indicative of events,
  generate an interpolation filter according to desired sampling times, and
  interpolate the sequences of time-stamped data with the generated filter to obtain synchronized sequences of data indicative of the events.

The control unit 422 may include machine instructions 440 that control one or more of the devices in the control unit and the sensor units to carry out the tasks described above. The machine instructions 440 may reside in the data storage 428 or the memory 426. In some examples the machine instructions may be remotely located and communicated to the control unit 422 as needed, for example in a cloud computing environment.

In some examples the control unit 422 may also serve as a sensor unit by addition of a sense element, or its functions may be performed by one or more devices in the one or more of the sensor units.

In some examples the system includes an event trigger 442 to induce events.

In some examples the sense elements comprise seismic sensors, for example accelerometers, coupled to the earth to detect seismic events. The trigger in these examples may comprise explosives or vibrator trucks to induce seismic events. The trigger may be controlled by the control unit 422 or operated asynchronously by a user, or the trigger may be omitted in the case of systems used to monitor naturally-occurring seismic events.

In some examples the corrected sequence of time-stamped data may be communicated to a user through the monitor 432 or through a printer (not shown), or may be stored in the data storage 428 for later reference, or may be communicated through the communication port 430 for use elsewhere.

As described above, in some examples non-linear and linear estimating techniques may be combined to correct inaccurate timestamps or in other ways to reduce noise in sequences of data from one or more of the sensors. In the case of a seismic analysis system, this may include extracting time-stamp information from a sequence of time-stamped data from a sensor to form an uncorrected sequence of time stamps, obtaining from the uncorrected sequence of time stamps an approximation of a corrected sequence of time stamps by least-squares approximation and cubic spline interpolation, subtracting the approximation of the corrected sequence of time stamps from the uncorrected sequence of time stamps to obtain an estimate of noise in the uncorrected sequence of time stamps, filtering the estimate with a linear low-pass filter to obtain a filtered sequence, adding the filtered sequence to the approximation of the corrected sequence of time stamps to obtain a corrected sequence of time stamps, and replacing the time-stamp information in the sequence from that sensor with the corrected sequence of time stamps to obtain a corrected sequence of time-stamped data indicative of the seismic events.

Interpolation by filtering with a low-pass (fractional delay) filter and applying a roll-off will now be described in more detail. Although this description is written in the context of one specific application—synchronizing seismic data by interpolation using time stamps—the techniques may readily be adapted to achieving synchronization in other data sequences that represent acceleration or other physical quantities.

Sensed data corresponds with discrete time samples of a low-pass continuous time signal band-limited to bandwidth W. If the samples are taken at a sufficiently high rate (larger than 2 W) the continuous time signal may be recovered from the samples, and this continuous signal may be sampled again at any desired times. However, as discussed above, the sampling clock used to sample the data has drift (a slowly-varying frequency). Therefore interpolation and resampling must be performed over sequences of sufficiently short duration that the sampling frequency remains approximately constant throughout the sequence. Also, computational complexity should be kept low. For these reasons it is desirable to limit the length of the impulse response of the interpolation filter. The filter should minimize any interpolation error.

Moreover, as discussed above, there may be uncertainty in the times at which individual samples are taken due to random errors in the sensor clocks. This uncertainty may be characterized as noise in the timestamps themselves. It may be desirable to reduce this noise before interpolating.

The sequence of data from a sensor can considered as a set of values x[m] of a band-limited signal. Each value has an associated timestamp $t_c[m]$. To analyze the values from more than one sensor, the timestamps should coincide; that is, the value x[1] of the signal from sensor A should be taken at the same time as the value x[1] of the signal from sensor B. But, as discussed above, drift of the clocks at the various sensors results in these samples not being taken at the same time. It may be desired, for example, to obtain values of samples from all the sensors at times $$t_d[m] = t_d[m-1] + T_d$$

where $T_d$ is a constant sampling period. The desired sampling times and intervals may be predetermined for a sensor network or may be decided, for example by a user, before or after an event or series of events.

The sampled discrete time signal from a sensor can be represented as:

$$x[1] = X(t_c[1])$$

$$x[m] = X(t_c[m]) = X(t_c[m-1] + 1/(f_s(t_c[m-1])))$$

where:
X(·) is a continuous time signal band-limited to bandwidth W,
W is a one-sided bandwidth of X(t)
B is the two-sided bandwidth 2 W,
$t_c[1]$ is the time at which the first sample is taken,
$t_c[m] = t_c[1] + \Sigma_{i=1}^{m-1} 1/(f_s(t_c[i]))$,
$f_s(t)$ is the sampling frequency at time t. As discussed above, $f_s(t)$ may vary slowly with t.
In this example, $f_s$=500 Hz
f is high enough to avoid aliasing (for example, $f_s(t)$>2 W), and
f remains constant for a period of N samples (in this example, N=200).
The signal will be interpolated with a linear interpolation filter. An interpolation filter is a low-pass filter designed to suppress high frequency components introduced by the sampling process. An ideal low-pass filter has an infinitely long impulse response, with the result that any practical implementation using a finite number of filter taps will introduce at least some signal distortion. An interpolation filter given by $$g(t) = sinc\left(\frac{t}{T}\right) sinc\left(\frac{B_1 t}{\gamma}\right)^\gamma$$

where:

$$sinc(t) = \frac{\sin(\pi t)}{\pi t} sinc(0) = 1,$$

$T = \frac{1}{f_s(t)}$ is the sampling period of the signal around time t, $B_1 = \frac{1}{T} - B$, and $\gamma > 0$ is used to control roll-off characteristics of the filter.

The first factor in g(t) corresponds with the impulse response of an ideal low-pass filter with two-sided bandwidth 1/T. The second factor introduces a more gradual roll-off of the frequency response of this filter without distorting the passband between frequencies f∈[0,B/2].

Let $\hat{m} = \arg\min_k |t_d[m] - t_c[k]|$ and $T = t_c[\hat{m}] - t_c[\hat{m}-1]$. Approximate the signal at time $t_d[m]$ using:

$$\hat{x}[m] = \sum_{k=\hat{m}-P}^{\hat{m}+P} g(t_d[m] - t_c[k]) x[k].$$

This approximation uses only the first 2P+1 taps of the interpolation filter. Because of the use of limited number of taps, there is an interpolation error. This error at time t=nT+u, 0≤u≤T can be upper bounded by:

$$\left| \sum_{|p|>P} x((n-p)T) g(pT+u) \right| \le A_x \sum_{|p|<P} |g(pT+u)| \le A_x \epsilon(P, \gamma, B, T)$$

where:
$A_x$ is a upper bound on the magnitude of the signal x(t)
x(t) is of bounded amplitude, and $$\epsilon(P,\gamma,B,T) = \max_u \Sigma_{|p|>P} |g(pT+u)|.$$

Figure 5:
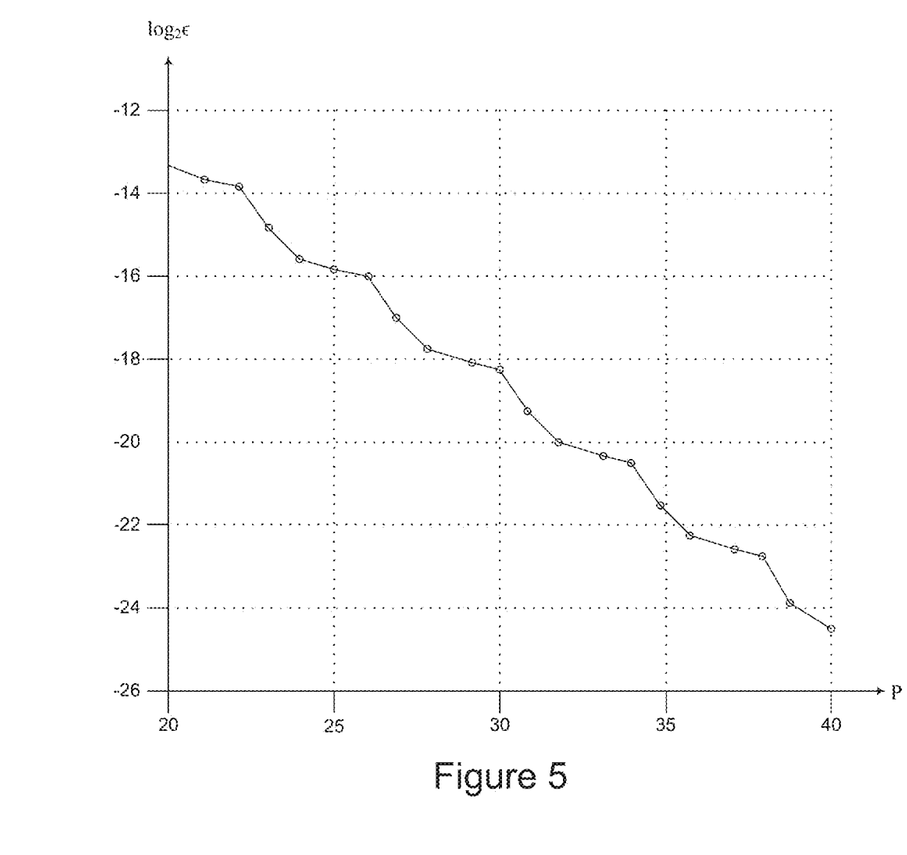
FIG. 5 is a graph showing an example of an upper bound on error in bits according to number of taps in a signal interpolation filter.
Figure 6:
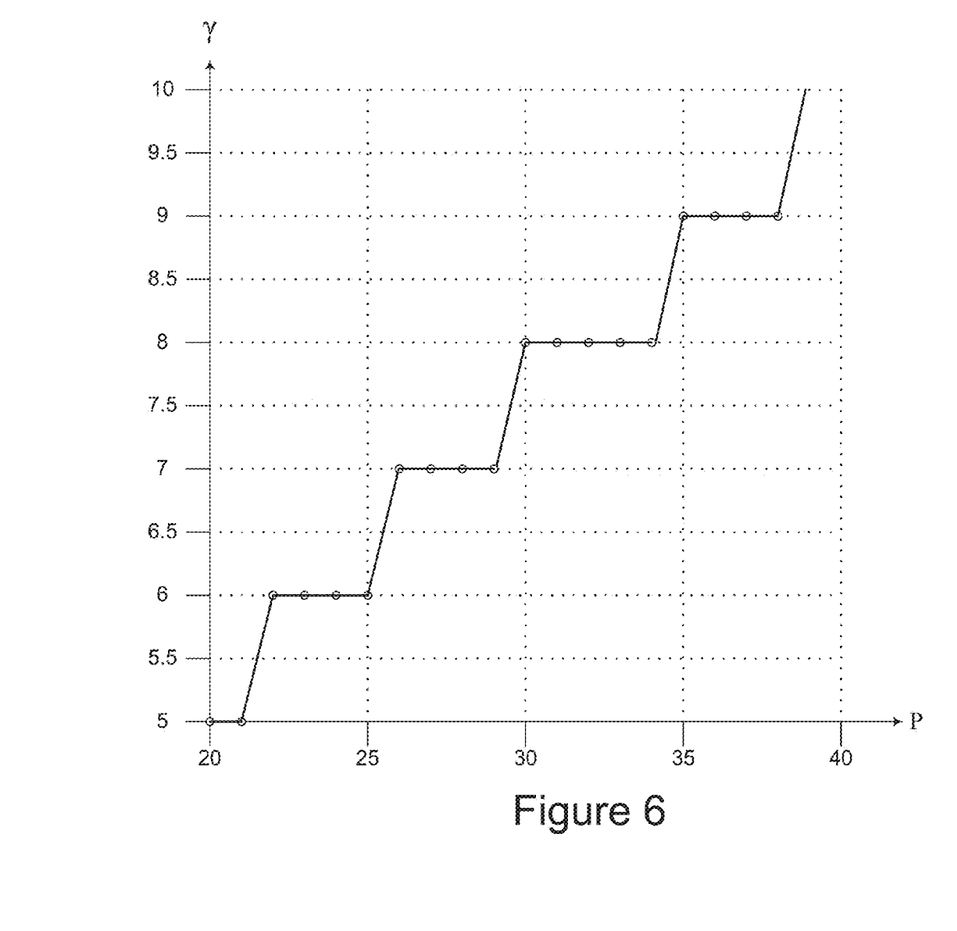
FIG. 6 is a graph showing optimum values of a roll-off characteristic of a signal interpolation filter.

To have b bits of useful resolution in the interpolated signal requires that $\epsilon(P, \gamma, B, T) < 2^{-b}$. Of these parameters, T and B are given by the problem at hand whereas P and γ can be optimized. To minimize computation complexity, which in turn depends on interpolation filter length, minimize P for a given error requirement $\epsilon(P, \gamma, B, T) = 2^{-b}$ and find an optimal value for γ. For B=400 Hz and T=2 ms, FIG. 5 shows, for a given number of taps 2P+1 in the interpolation filter, an upper bound on the error in bits and FIG. 6 shows optimum γ.

As an example, assume an error term of the order of $2^{-20}$ is needed, representing 20 bits of useful signal resolution, or, equivalently, a signal-to-noise ratio (SNR) of 120 dB. If T=2 ms and B=400 Hz, then P=31 and γ=8 yields an acceptable interpolation error.

Performance of the interpolation filter may be evaluated with a frequency sweep (chirp) input signal. An example is a chirp signal that goes from 0 to 100 Hz over a period $T_p$ of 10 seconds. To avoid introducing high-frequency components at the end of the sweep by the abrupt termination, this evaluation signal is damped at the end of the sweep with a raised-cosine window. The evaluation signal is given by:

$$x(t) = \begin{cases} \frac{1}{2}(1-\cos(2\pi F_d(t-T_p)))\sin\left(\frac{2\pi Ft^2}{T_p}\right) & \text{for } T_p - \frac{1}{2F_d} \le t \le T_p \\ \sin\left(\frac{2\pi Ft^2}{T_p}\right) & \text{for } 0 \le t \le T_p - \frac{1}{2F_d} \end{cases}$$

where $F_d$=10 Hz makes the trailing edge of the raised-cosine window last 0.05 seconds.

The evaluation signal is passed through a low-pass filter that approximates the sensor's ASIC anti-aliasing filter. For example, an equiripple low-pass filter with sampling frequency 5,000 Hz, pass-band frequency 200 Hz, and stop-band frequency 275 Hz may be used. The ripple in the pass band may be set to 0.0057563991496 and the stop-band attenuation to −140 dB. The output of the filtered signal is sampled to simulate a non-ideal sampling clock. Each sample is tagged with an error-free timestamp representing the actual time at which the signal was sampled. The actual timestamps may have errors that can be characterized as noise, and this noise can be reduced by a combination of non-linear and linear techniques as will be described presently. To compute the interpolation error, the low-pass filtered chirp signal may be sampled with an ideal sampling clock at desired sampling times.

Figure 7:
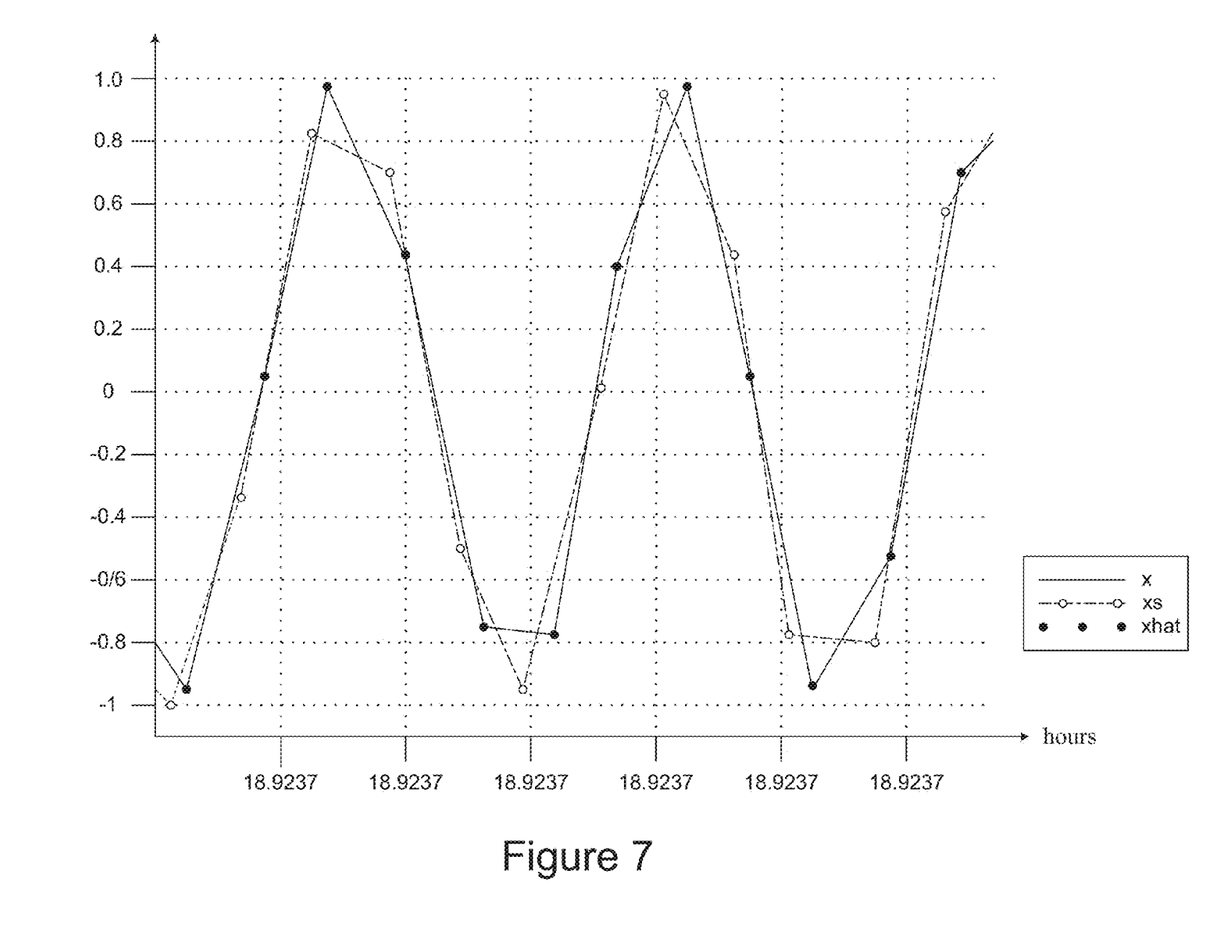
FIG. 7 is a graph showing an example of a non-linear technique being used to prepare an approximation of a noise-free sequence of data.

FIG. 7 shows that the interpolation error, computed using the signal obtained with an ideal sampling clock and an interpolation filter with parameters P=31 and γ=8, is very small.

Figure 8:
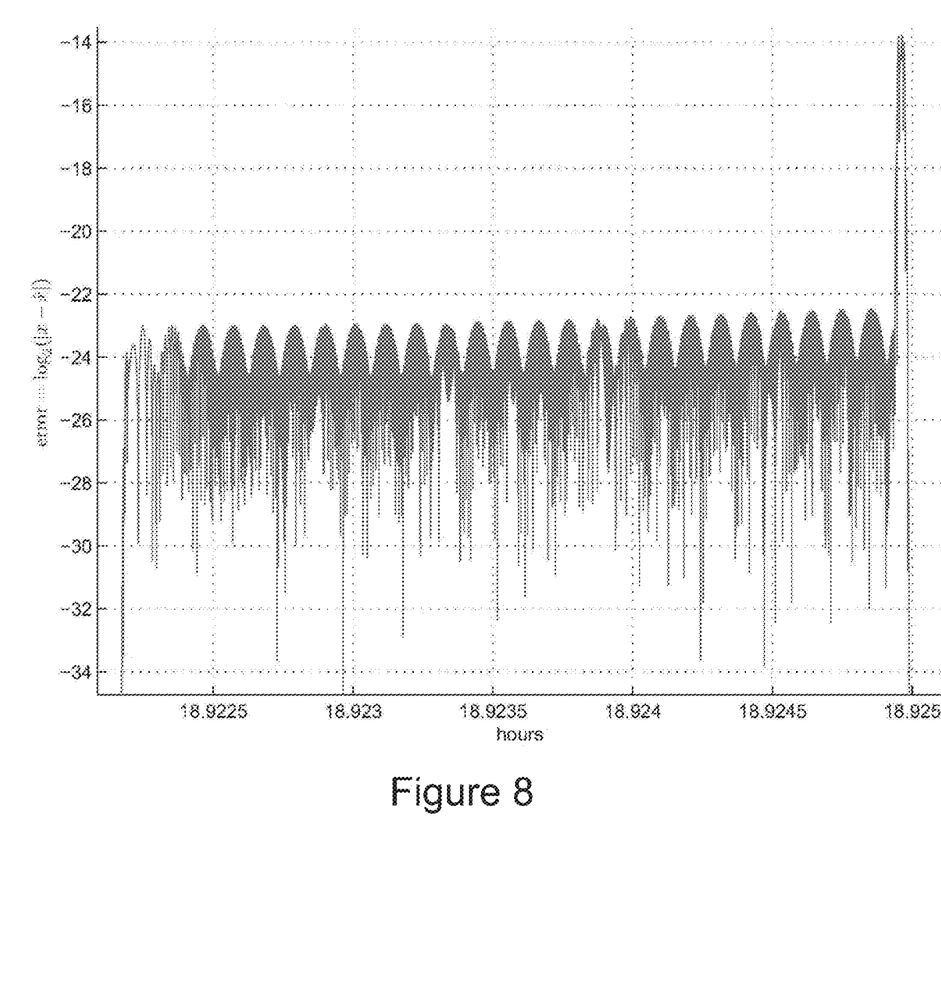
FIG. 8 is a graph showing an example of the difference between actual and interpolated signals without low-pass filtering.

FIG. 8 shows the difference between actual and interpolated signals without low-pass filtering. The interpolation error increases slightly with the frequency of the chirp signal, becoming much larger when the frequency content of that signal exceeds W.

Figure 9:
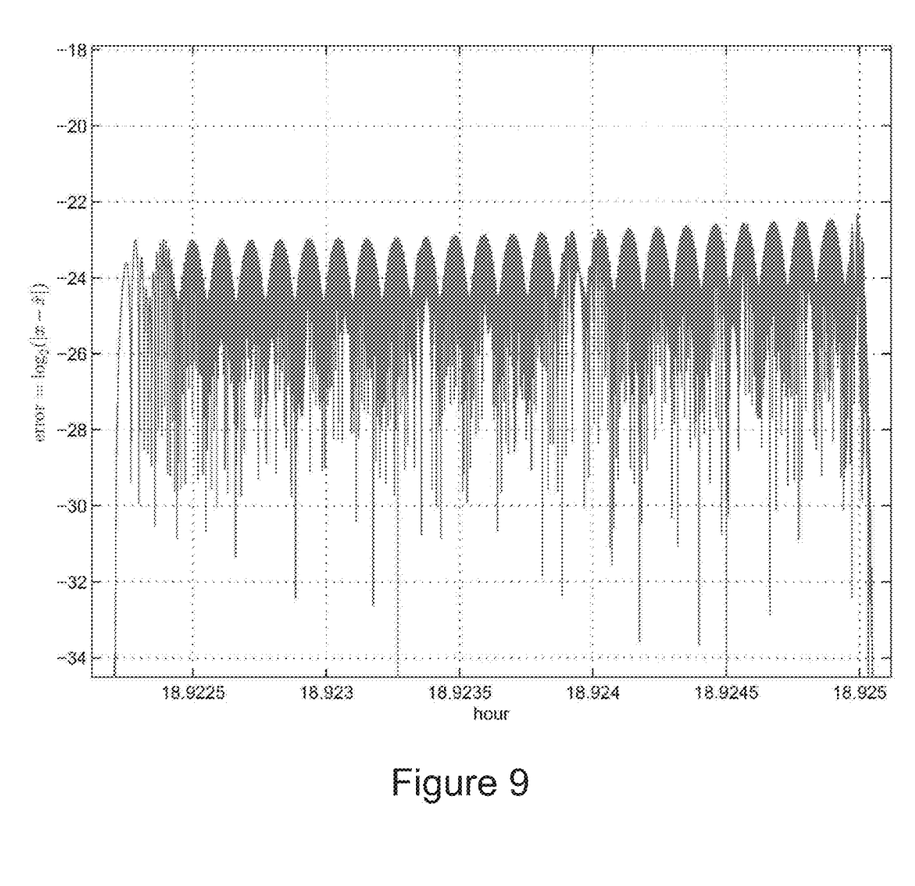
FIG. 9 is a graph showing an example of the difference between actual and interpolated signals after low-pass filtering.

FIG. 9 shows an example of how low-pass filtering can avoid the large error seen in FIG. 8 at the end of the sweep. This example uses an equiripple low-pass filter with sampling frequency 500 Hz, pass-band frequency 200 Hz, stop-band frequency 224 Hz, pass-band ripple of 0.0028782234183, and stop band attenuation of −165 dB.

The foregoing interpolation has been implemented in Matlab and run on a laptop computer with an AMD dual core processor running at 2.8 GHz with 4 GB RAM. Six hours were sufficient to interpolate a 10-day-long data sequence. The run time may be reduced by more efficient programming, for example using the C language in the Matlab MEX interface; approximating the coefficients of the interpolation filter with polynomial; and pre-computing and storing all possible filter coefficients for use as needed. The amount of memory needed depends on sampling frequency T, filter length 2P+1, and desired timing resolution. For example, for T=2 ms, P=36, and timing resolution of 0.1 ns, the memory needs to store 703w MB of data, where w is the number of bytes per filter coefficient.

As discussed previously, in some examples the sampling times are affected by random errors, resulting in noisy timing sequences. This noise can be reduced by a combination of non-linear and linear techniques as will now be explained in more detail.

Notation:

T[m]=the m-th noisy (uncorrected) timestamp in a sequence of N noisy timestamps.

z[m]=the noise in the m-th noisy timestamp.

$\tilde{t}$[m]=the m-th reduced-noise timestamp as approximated by a non-linear technique.

$\{\tilde{t}[m]\}_{m=1}^{N}$=the sequence of approximated reduced-noise timestamps.

$\hat{t}$[m]=the m-th reduced-noise timestamp after correction by non-linear and linear techniques.

t[m]=the m-th noise-free timestamp in the sequence.

$\{t[m]\}_{m=1}^{N}$=the noise-free sequence of timestamps.

Assumptions:

the clean time-stamped sequence is characterized by a low-pass frequency spectrum;

the time stamps are recorded at regular intervals (for example, every millisecond); and the intervals are defined by a number of cycles of the local clock (for example, one time stamp may be recorded for every 50 data samples).

To provide the sequence of approximated reduced-noise timestamps $\{\tilde{t}[m]\}_{m=1}^{N}$, let $\Delta_1$ and $\Delta_2$ be constants (to be explained presently) that may be optimized for a given problem. For example, choose $\Delta_1 = 5 \cdot 10^3$ and $\Delta_2 = 2.5 \cdot 10^3$. For m=k$\Delta_1$ and k ∈ ℤ compute the linear least square approximation of T[n] for n=m−$\Delta_2$, m−$\Delta_2$+1, . . . , m+$\Delta_2$, and evaluate this approximation at n=m to obtain $\tilde{t}$[m]. Then, to obtain $\tilde{t}$[n] for n≠k$\Delta_1$ interpolate the sequence $\{\tilde{t}[m]\}_{m=k\Delta_1}$ using a cubic spline.

Figure 10:
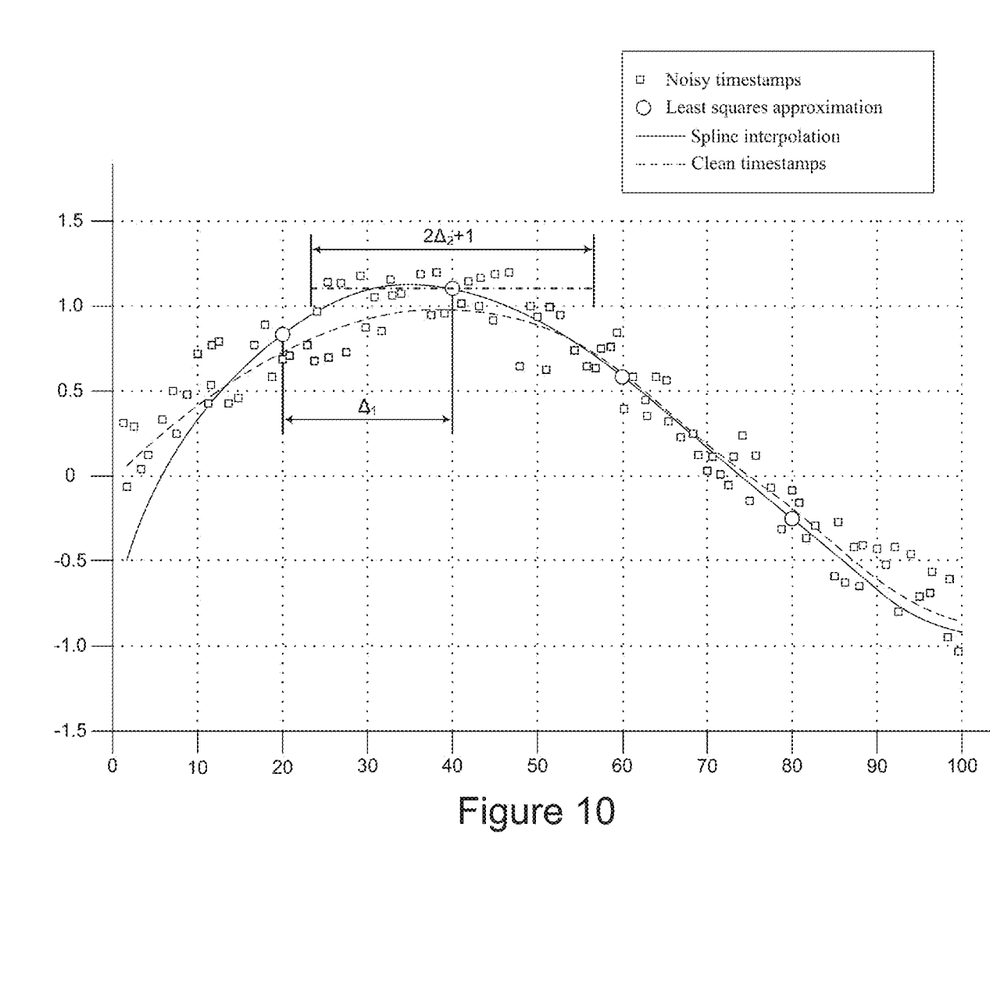
FIG. 10 is a graph showing an example of a non-linear technique being used to prepare an approximation of a noise-free sequence of data.

This technique is depicted graphically in FIG. 10. The parameter $\Delta_1$ determines the distance between the reference points used to trace the spline, while $\Delta_2$ determines the number of noisy timestamps used in the linear least squares approximation. Choosing a larger value of $\Delta_2$ allows for a smaller error in $\tilde{t}$[m] but may result in increasing error due to non-linear behavior of the underlying signal t[m]. Choosing a smaller value of $\Delta_1$ results in more reference points to generate the spline, and this in turn produces an estimate that more closely follows the underlying signal t[m] but may introduce more spurious high-frequency components. The actual numeric computation is speeded up by making $\Delta_1$ larger and $\Delta_2$ smaller.

After the approximation $\tilde{t}$[m] of the corrected time stamps has been determined as described above, the approximation is subtracted from the noisy sequence T[m] to get an estimate of the noise. A linear technique, for example a linear time-invariant (LTI) low-pass filter, is used to obtain a filtered sequence from the estimate of the noise, and then the filtered sequence is added back into the approximation of the corrected time stamps to obtain the corrected time stamp sequence:

$$\hat{t}[m] = h[n]*(T[m]-\tilde{t}[m])+\tilde{t}[m] \qquad (1)$$

where * denotes convolution and h[n] is the impulse response of the LTI low-pass filter.

For convenience, in the following discussion of the LTI low-pass filter it is assumed that:

$\{t[m]\}_{m=1}^{N}$ (the actual sequence of clean time stamps) is a random signal with band-limited spectrum, the noise $\{z[m]\}_{m=1}^{N}$ is independent of this signal, and $\{t[m]\}_{m=1}^{N}$ is a wide sense stationary (WSS) random process.

These assumptions imply that the power spectral density $S_t(\Omega)=0$ for $|\Omega|>B_t$ the corresponding bandwidth. However, these assumptions are not essential.

The sequence $\tilde{t}[m]$ may be considered as the sum of sequences $t[m]$ and $e[m]$ which for convenience are assumed to be independent. For a reference frequency $\Omega_0$ in the pass band of the filter, let $$S_e(\Omega_0)/S_t(\Omega_0) = \epsilon_1$$

$$|H(\Omega_0)|^2 = 1 + \epsilon_2$$

$$S_z(\Omega_0)/S_t(\Omega_0) = \epsilon_3$$

where
 $S_e$ is the power spectral density of $\{e[m]\}$,
 $S_z$ is the power spectral density of $\{z[m]\}$,
 $H(\Omega)$ is the discrete time Fourier transform of $\{h[n]\}$,
 $\epsilon_1$ represents the error in approximating $t[m]$ by $\tilde{t}[m]$,
 $\epsilon_2$ represents non-ideal filter attenuation or gain, and
 $\epsilon_3$ represents error due to the additive noise $z$.
Then:

$$\frac{S_{\bar{t}}(\Omega_0)}{S_t(\Omega_0)} = |H(\Omega_0)|^2 \left(1 + \frac{S_z(\Omega_0)}{S_t(\Omega_0)}\right) \quad (2)$$
$$= (1+\epsilon_2)(1+\epsilon_3)$$
$$= 1 + \epsilon_2 + \epsilon_3 + \epsilon_2\epsilon_3$$

and $$\frac{S_{\hat{t}}(\Omega_0)}{S_t(\Omega_0)} = |H(\Omega_0)|^2 \left(-\frac{S_e(\Omega_0)}{S_t(\Omega_0)} + \frac{S_z(\Omega_0)}{S_t(\Omega_0)}\right) + \frac{S_{\tilde{t}}(\Omega_0)}{S_t(\Omega_0)} \quad (3)$$
$$= (1+\epsilon_2)(\epsilon_3 - \epsilon_1) + 1 + \epsilon_1$$
$$= 1 + \epsilon_3(1+\epsilon_2) - \epsilon_1\epsilon_2$$

where $$\bar{t}[m] = h[n]*T[m],$$

$S_t$ is the power spectral density of $\{t[m]\}$,
 $S_{\tilde{t}}$ is the power spectral density of $\{\tilde{t}[m]\}$, and
 $S_{\bar{t}}$ is the power spectral density of $\{\bar{t}[m]\}$.

Equation (2) is representative of the error that would result from applying only the linear technique. Error in equation (2) may be made small by making $\epsilon_2$ and $\epsilon_3$ of the same order. Error in equation (3) may be made small by making $(\epsilon_1\epsilon_2)$ and $\epsilon_3$ of the same order. Therefore a large filter distortion $\epsilon_2$ can be tolerated provided $\epsilon_1$ is relatively small, that is, if $\tilde{t}[m]$ is a good approximation of $t[m]$. In other words, by using both the non-linear and linear techniques, a larger $\epsilon_2$ can be tolerated than would be the case if only the linear technique were used. Since $\epsilon_1$ may be much larger than $\epsilon_3$, as a general matter $\tilde{t}[m]$ should not be used as a direct estimate of $t[m]$; instead, the non-linear and linear techniques should both be used as in equation (1).

The sequence of approximated reduced-noise timestamps $\{\tilde{t}[m]\}_{m=1}^{N}$ does not have the strict error requirements of the final estimate $\{\hat{t}[m]\}_{m=1}^{N}$ but should have similar spectrum content because $$\frac{S_e(\Omega)}{S_t(\Omega)} \ll 1$$

Spurious high-frequency components should not be introduced.

The LTI low-pass filter should have a low cut-off frequency. This results in a filter with a long impulse. Implementing such a filter in the time domain can be computationally intense. This problem can be avoided by instead implementing a fast Fourier transform (FFT) in the frequency domain.

An FFT operates on a periodic time-domain sequence. Applying an FFT to the estimate of the noise sequence that is obtained by subtracting the corrected-sequence approximation $\{\tilde{t}[m]\}_{m=1}^{N}$ from the original uncorrected sequence implicitly performs a periodic extension of the sequence, creating edge artifacts that translate into spurious high-frequency components. This may be minimized by multiplying the estimate of the noise sequence by a window function such as a raised cosine described as:

$$f_L[n] = \begin{cases} \frac{1}{2}\left[1 - \cos\left(\frac{\pi}{L}n\right)\right] & ; 1 \le n \le L \\ 1 & ; L < n < N - L \\ \frac{1}{2}\left\{1 - \cos\left[\frac{\pi}{L}(N-n+1)\right]\right\} & ; N-L+1 \le n \le N \end{cases}$$

where:
 N is the length of the sequence T, and
 L is the length of the leading and trailing edges of the window.

Figure 11:
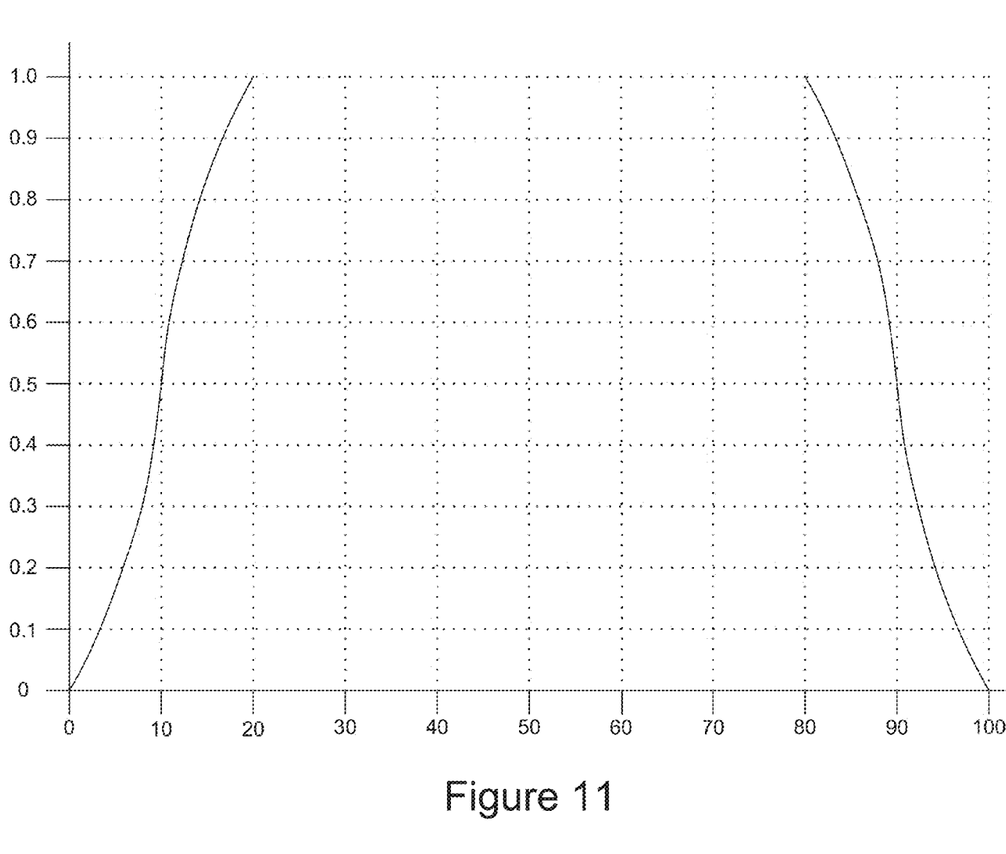
FIG. 11 is a graph of an example of a raised cosine window function that may be used to minimize edge artifacts that translate into spurious high-frequency components during linear estimation.

This is illustrated in FIG. 11 for N=100 and L=20.

For example, L may be chosen to be 72,000, corresponding with two hours of timestamps at a frequency of 10 Hz. Choosing a large value for L reduces distortion in the signal due to edge effects but requires discarding more data in the edges of the signal since the timestamps affected by the window are heavily distorted. L should be much smaller than N to minimize the amount of discarded data. Applying the N-point FFT yields $$F_1[k] = \text{FFT}_N\{(T-\tilde{t}) \cdot f_L\}[k], \; 1 \le k \le N$$

where the raised dot, ·, indicates component-wise multiplication.

Figure 12:
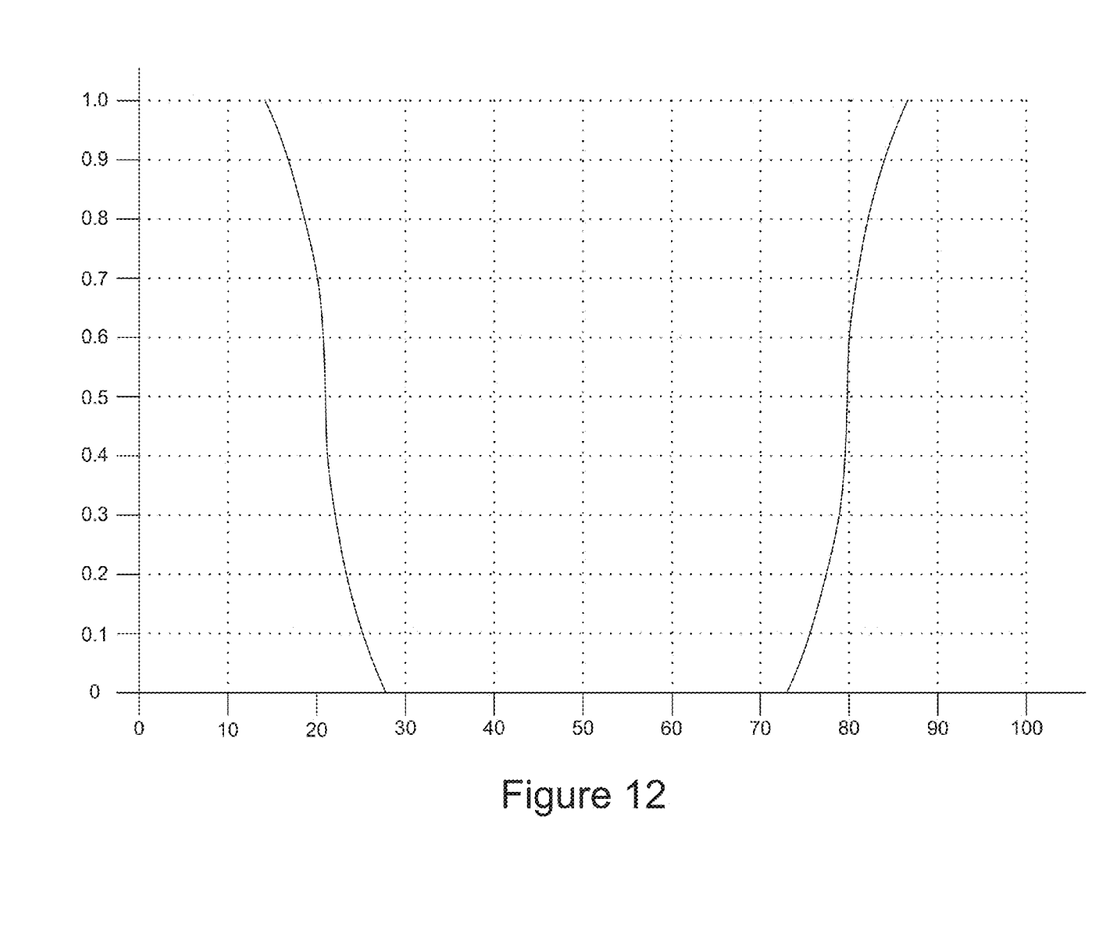
FIG. 12 is a graph of an example of the frequency response of a raised cosine low-pass filter that may be used in linear estimation.

Any desired low-pass filter with cut-off frequency $B > B_t$ may be used to perform the LTI filtering. $B_t$ is the bandwidth of the underlying clean timestamp sequence $\{t[m]\}$; in cases where $\{t[m]\}$ is not strictly band limited, $B_t$ is some bandwidth where $\{t[m]\}$ contains most of its energy. As shown in FIG. 12, an example of a raised cosine low-pass filter has the following frequency response:

$$H[k] = \begin{cases} 1 & ; 1 \le k \le \tilde{B}+1 \\ \frac{1}{2}\left\{1 - \cos\left[\frac{\pi}{\lfloor\beta\tilde{B}\rfloor}\left(\frac{\lfloor\tilde{B}(1+\beta)\rfloor-}{k+2}\right)\right]\right\} & ; \tilde{B}+2 \le k \le \lfloor\tilde{B}(1+\beta)\rfloor+1 \\ 0 & ; \lfloor\tilde{B}(1+\beta)\rfloor+2 \le k \le N-\lfloor\tilde{B}(1+\beta)\rfloor \\ \frac{1}{2}\left\{1 - \cos\left[\frac{\pi}{\lfloor\beta\tilde{B}\rfloor}*\left(\frac{k-N+}{\lfloor\tilde{B}(1+\beta)\rfloor}\right)\right]\right\} & ; N-\lfloor\tilde{B}(1+\beta)\rfloor+1 \le k \le N-\tilde{B} \\ 1 & ; N-\tilde{B}+1 \le k \le N \end{cases}$$

where $$\tilde{B}=\lceil BN/2\pi\rceil \text{ and}$$

$\beta$ specifies the roll-off factor as a fraction of the bandwidth $\tilde{B}$. These parameters $\tilde{B}$ and $\beta$ are chosen based on;
- the spectral content of the approximation $\{t[m]-\tilde{t}[m]\}$
- the spectral content of the noise $\{z[m]\}$, and
- the length L of the rising and falling edges of the window $f_L$.

The low-pass filtered signal is given by:

$$F_2[k]=H[k]\cdot F_1[k]\ 1\leq k\leq N$$

leading to the result $$\hat{t}[m]=\text{IFFT}_N\{F_2\}+\tilde{t}[m]$$

where $\text{IFFT}_N$ is the N-point inverse FFT.

In one example the following parameters are used:
- timestamps are recorded at a frequency of 10 Hz,
- underlying sampling clock has a frequency stability of 10 ppm or better, and
- timestamp error is of the order of one microsecond for which:

$$B=2.09\cdot 10^{-4}$$

$$\Delta_1=5\cdot 10^3$$

$$\Delta_2=2.5\cdot 10^3$$

$$L=72\cdot 10^3 \text{ and}$$

$$\beta=0.5$$

give good results.

In some applications low-pass filtering in the time domain by convolution, rather than in the frequency domain, may result in a better computational complexity.

Synchronizing data sequences from a plurality of sensors after collection of the data relieves the sensor units from the energy-taxing task of synchronizing local clocks to external time references (such as GPS receivers). Also, timestamp de-noising can significantly improve the quality of the timestamps provided when the data are initially gathered, allowing the use of simpler and less-expensive clocks and even further energy savings.

What is claimed is:

1. A method of synchronizing sensor data comprising:
   receiving sequences of time-stamped data indicative of physical events from a plurality of sensors;
   generating an interpolation filter according to desired sampling times;
   interpolating the sequences of time-stamped data with the generated interpolation filter to obtain synchronized sequences of data that are synchronized at the desired sampling times;
   subtracting an approximation of a noise-free sequence from at least one sequence of the time-stamped data to obtain an estimate of noise in the at least one sequence; and
   adding a filtered sequence to the approximation of the noise-free sequence to obtain a reduced-noise sequence of time-stamped data.

2. The method of claim 1 wherein the interpolation filter comprises a low-pass impulse response filter with roll-off.

3. The method of claim 1 further comprising:
   applying a non-linear technique to the at least one sequence to obtain the approximation of the noise-free sequence; and
   applying a linear technique to the estimate to obtain the filtered sequence.

4. The method of claim 3 wherein the non-linear technique comprises:
   approximating the noise-free sequence at intervals by linear least-squares approximation; and
   interpolating between intervals by cubic spline interpolation.

5. The method of claim 3 wherein the linear technique comprises one of a fast Fourier transform and a linear low-pass time-invariant finite impulse response filter.

6. A method of analyzing data indicative of seismic events comprising:
   transmitting from each of a plurality of remotely-located sensors a sequence of time-stamped data indicative of seismic events;
   generating an interpolation filter according to desired sampling times;
   interpolating the sequences of time-stamped data with the generated filter to obtain synchronized sequences of data indicative of the seismic events; and
   reducing noise by:
      extracting noisy timestamps from any sequences having noisy timestamps;
      applying a non-linear technique to the noisy timestamps to obtain corresponding approximations of noise-free timestamps;
      subtracting the approximations from their corresponding noisy timestamps to obtain estimates of noise in the noisy timestamps;
      filtering the estimates by a linear low-pass filter to obtain corresponding filtered timestamps;
      adding the filtered timestamps to their corresponding approximations to obtain reduced-noise timestamps; and
      replacing the noisy timestamps in the seismic data with the reduced-noise timestamps to obtain corrected sequences of time-stamped seismic data.

7. The method of cam 6 wherein the interpolation filter comprises a low-pass impulse response filter with roll-off.

8. The method of claim 6 and further comprising triggering the seismic events.

9. The method of claim 6 wherein the non-linear technique comprises:
   computing from the noisy timestamps a linear least-squares approximation of noise-free timestamps at intervals; and
   interpolating between the intervals by cubic spline interpolation.

10. A data analysis system comprising:
    a plurality of remotely-located, spaced-apart sensor units each comprising a sense element and a clock; and
    a control unit in communication with the plurality of sensor units to:
       receive from each of the sensors a sequence of time-stamped data indicative of events;
       generate an interpolation filter according to desired sampling times;
       interpolate the sequences of time-stamped data with the generated interpolation filter to obtain synchronized sequences of data indicative of the events;
       apply a linear low-pass filter to an estimate of noise to obtain a filtered sequence;
       add the filtered sequence to an approximation of a corrected sequence of time stamps to obtain the corrected sequence of time stamps; and replace time-stamp information of the sequence of time-stamped data with the corrected sequence of time stamps to obtain a corrected sequence of time-stamped data indicative of the events.

11. The system of claim 10 wherein the interpolation filter comprises a low-pass impulse response filter with roll-off.

12. The system of claim 10 wherein the sense elements comprise seismic sense elements that couples to an earth and the events comprise seismic events.

13. The system of claim 12 and further comprising a seismic trigger that couples to the earth to induce the seismic events.

14. The system of claim 10 wherein the control unit is in communication with the sensor units to:
   extract the time-stamp information from the sequence of time-stamped' data from that sensor to form an uncorrected sequence of time stamps;
   obtain from the uncorrected sequence of time stamps the approximation of the corrected sequence of time stamps by least-squares approximation and cubic spline interpolation; and
   subtract the approximation of the corrected sequence of time stamps from the uncorrected sequence of time stamps to obtain the estimate of noise in the uncorrected sequence of time stamps.

* * * * *